United States Patent [19]

Okouchi

[11] Patent Number: 5,228,033
[45] Date of Patent: Jul. 13, 1993

[54] DATA MULTIPLEXING AND SEPARATION METHOD

[75] Inventor: Fusakichi Okouchi, Atsugi, Japan

[73] Assignee: Ricoh Company, Ltd., Tokyo, Japan

[21] Appl. No.: 767,379

[22] Filed: Sep. 30, 1991

[30] Foreign Application Priority Data

Oct. 5, 1990 [JP] Japan .................................. 2-266682

[51] Int. Cl.⁵ .............................................. H04J 3/00
[52] U.S. Cl. ..................................... 370/84; 370/109;
    370/110.1; 370/112; 358/141
[58] Field of Search ........................ 370/7, 125, 77, 82,
    370/83, 84, 94.1, 94.2, 95.1, 99, 100.1, 105.1,
    105.2, 109, 110.1, 110.4, 111, 112, 118; 358/133,
    141, 142, 143, 148; 381/29, 31, 34; 382/41, 56

[56] References Cited

U.S. PATENT DOCUMENTS

| | | | |
|---|---|---|---|
| 4,002,846 | 1/1977 | Barbier | 370/110.1 |
| 4,068,098 | 1/1978 | Thyselius | 370/84 |
| 4,864,562 | 9/1989 | Murakami et al. | 370/84 |
| 4,939,723 | 7/1990 | Harley, Jr. et al. | 370/84 |
| 5,086,425 | 2/1992 | Le Goffic et al. | 370/84 |

Primary Examiner—Douglas W. Olms
Assistant Examiner—Alpus H. Hsu
Attorney, Agent, or Firm—Oblon, Spivak, McClelland, Maier & Neustadt

[57] ABSTRACT

The invention is a data multiplexing and separation method. It takes a plural number of timing data from memory that stores the plural number of timing data so as to detect bit positions on frame data signals on which bits respectively affiliated with a plural number of data are arranged. The plural number of timing data is used as the basis to arrange data to the frame data signal by successively arranging bits respectively affiliated with the plural number of data to the frame data signal so that the plural number of data is multiplexed to the frame data signals. And also it extracts a plural number of data from frame data signals by successively taking bits respectively affiliated with multiplexed the plural number of data from the frame data signals on the basis of the plural number of timing signals, and extracts a plural number of the multiplexed data from the frame data signals.

12 Claims, 15 Drawing Sheets

FIG. 3

| (FRAME) | | (OCTET) | | | | | | |
|---|---|---|---|---|---|---|---|---|
| | 1 | 2 | 3 | 4 | 5 | 6 | 7 | 8 |
| 1 | N1 | 0 | 0 | 1 | 1 | 0 | 1 | 1 |
| 2 | 0 | 1 | A | E | C1 | C2 | C3 | C4 |
| 3 | N2 | 0 | 0 | 1 | 1 | 0 | 1 | 1 |
| 4 | 0 | 1 | A | E | C1 | C2 | C3 | C4 |
| 5 | N3 | 0 | 0 | 1 | 1 | 0 | 1 | 1 |
| 6 | 1 | 1 | A | E | C1 | C2 | C3 | C4 |
| 7 | N4 | 0 | 0 | 1 | 1 | 0 | 1 | 1 |
| 8 | 0 | 1 | A | E | C1 | C2 | C3 | C4 |
| 9 | N5 | 0 | 0 | 1 | 1 | 0 | 1 | 1 |
| 10 | 1 | 1 | A | E | C1 | C2 | C3 | C4 |
| 11 | R1 | 0 | 0 | 1 | 1 | 0 | 1 | 1 |
| 12 | 1 | 1 | A | E | C1 | C2 | C3 | C4 |
| 13 | R2 | 0 | 0 | 1 | 1 | 0 | 1 | 1 |
| 14 | R3 | 1 | A | E | C1 | C2 | C3 | C4 |
| 15 | TEA | 0 | 0 | 1 | 1 | 0 | 1 | 1 |
| 16 | R4 | 1 | A | E | C1 | C2 | C3 | C4 |

FIG. 4

| (1st OCTET) | (2nd OCTET) | | (80th OCTET) |
|---|---|---|---|
| 1 2 3 4 5 6 7 8 | 1 2 3 4 5 6 7 8 | ... | 1 2 3 4 5 6 7 8 |

⟶ TIME

FIG. 5

|  | (LSB)     (MSB) | |
|---|---|---|
| SCH1 | 1 0 0 0 0 0 0 0 | (01H)( 1~80th OCTET) |
| SCH2 | 0 1 0 0 0 0 0 0 | (02H)( 1~80th OCTET) |
| SCH3 | 0 0 1 0 0 0 0 0 | (04H)( 1~80th OCTET) |
| SCH4 | 0 0 0 1 0 0 0 0 | (08H)( 1~80th OCTET) |
| SCH5 | 0 0 0 0 1 0 0 0 | (10H)( 1~80th OCTET) |
| SCH6 | 0 0 0 0 0 1 0 0 | (20H)( 1~80th OCTET) |
| SCH7 | 0 0 0 0 0 0 1 0 | (40H)( 1~80th OCTET) |
| FAS | 0 0 0 0 0 0 0 1 | (80H)( 1~ 8th OCTET) |
|  | 0 0 0 0 0 0 0 0 | (00H)( 9~80th OCTET) |
| BAS | 0 0 0 0 0 0 0 0 | (00H)( 1~ 8th OCTET) |
|  | 0 0 0 0 0 0 0 1 | (80H)( 9~16th OCTET) |
|  | 0 0 0 0 0 0 0 0 | (00H)(17~80th OCTET) |
| AC | 0 0 0 0 0 0 0 0 | (00H)( 1~16th OCTET) |
|  | 0 0 0 0 0 0 0 1 | (80H)(17~80th OCTET) |

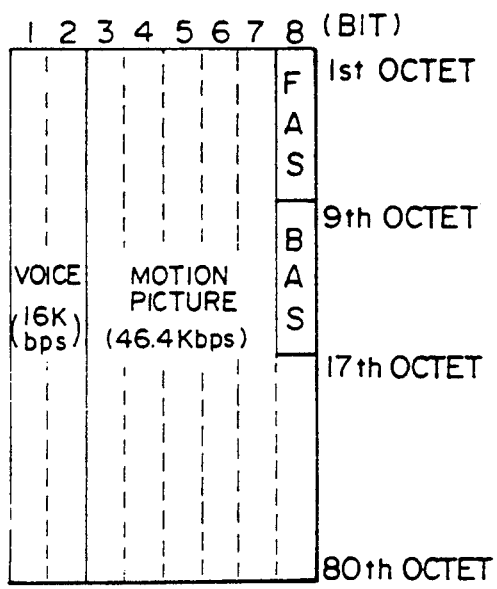

FIG. 9

| VOICE | 64 (Kbps) | FFH✻80 |
|---|---|---|
| | 56 | 7FH✻80 |
| | 48 | 3FH✻80 |
| | 32 | 0FH✻80 |
| | 16 | 03H✻80 |
| | 8 | 01H✻80 |
| | 0 | 00H✻80 |
| MOTION PICTURE | 62.4(Kbps) | 7FH✻16,FFH✻64 |
| | 46.4 | 7CH✻16,FCH✻64 |
| | 40 | 7CH✻80 |
| | 32 | 3CH✻80 |
| | 0 | 00H✻80 |
| DATA | 300 (bps) | 00H✻77,80H✻3 |
| | 1.2(Kbps) | 00H✻68,80H✻12 |
| | 4.8 | 00H✻32,80H✻48 |
| | 6.4 | 00H✻16,80H✻64 |
| | 8 | 40H✻80 |
| | 9.6 | 40H✻64,C0H✻16 |
| | 14.4 | 40H✻16,C0H✻64 |
| | 16 | 60H✻80 |
| | 24 | 70H✻80 |
| | 32 | 78H✻80 |
| | 40 | 7CH✻80 |
| | 56 | 7FH✻80 |
| | 62.4 | 7EH✻16,7FH✻64 |

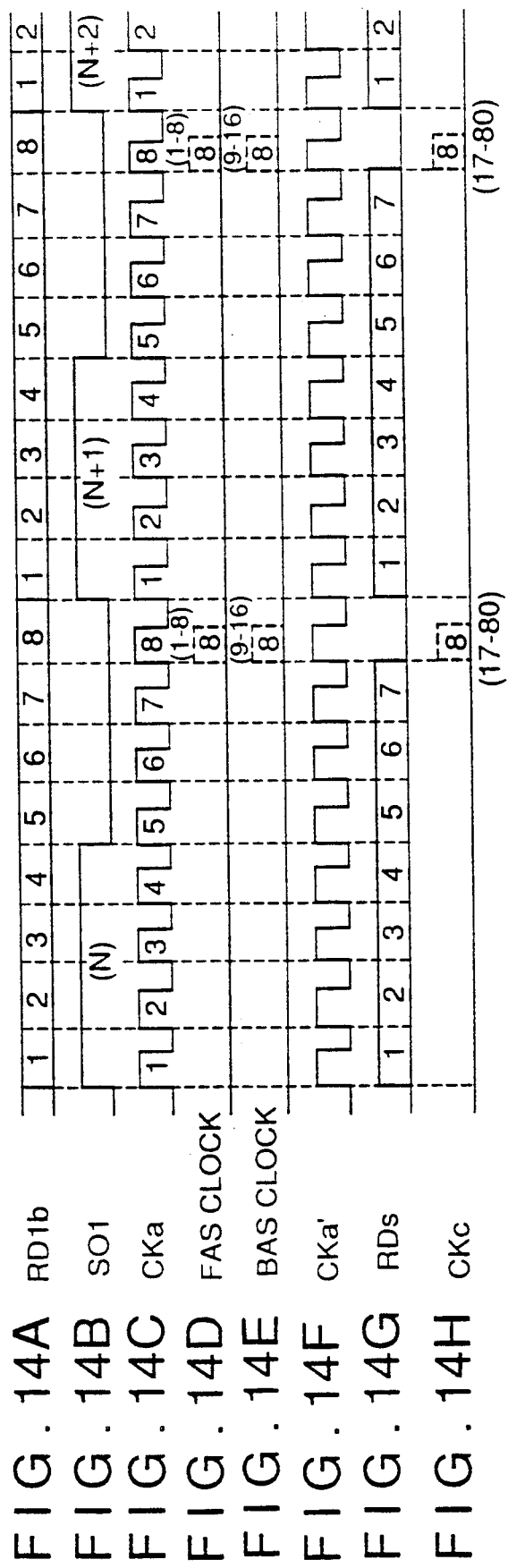

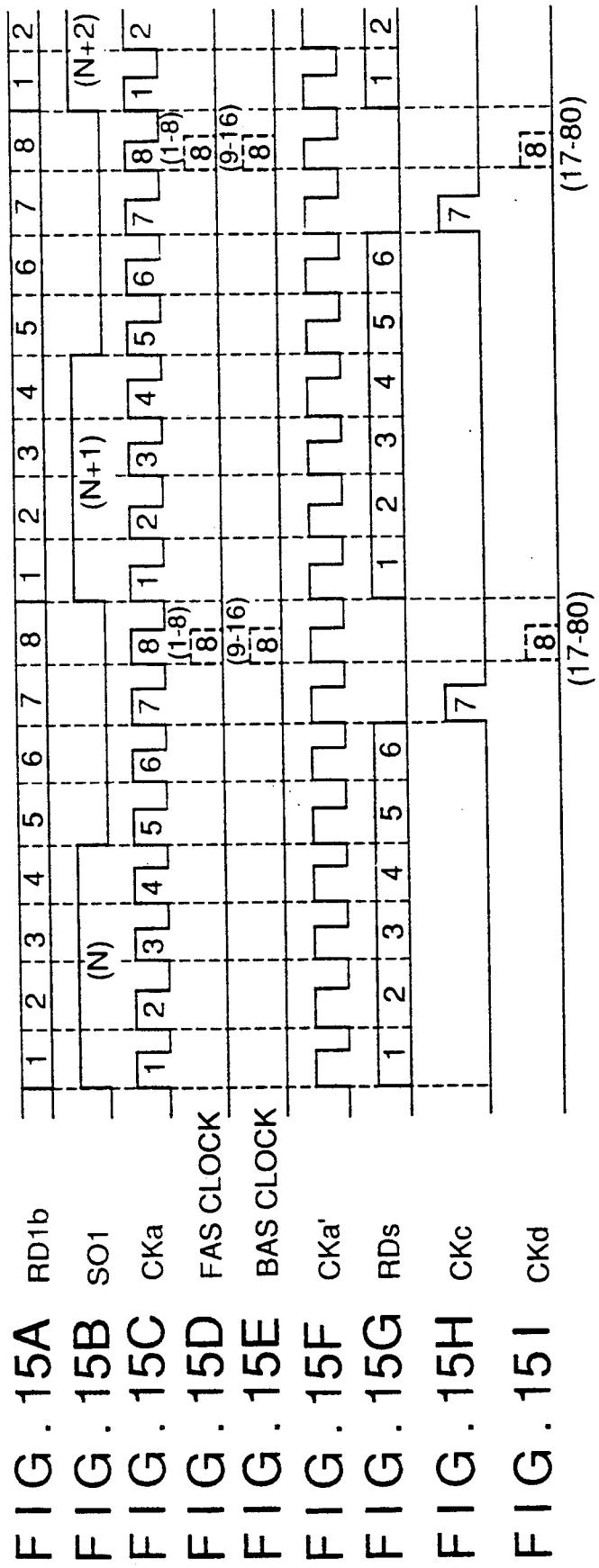

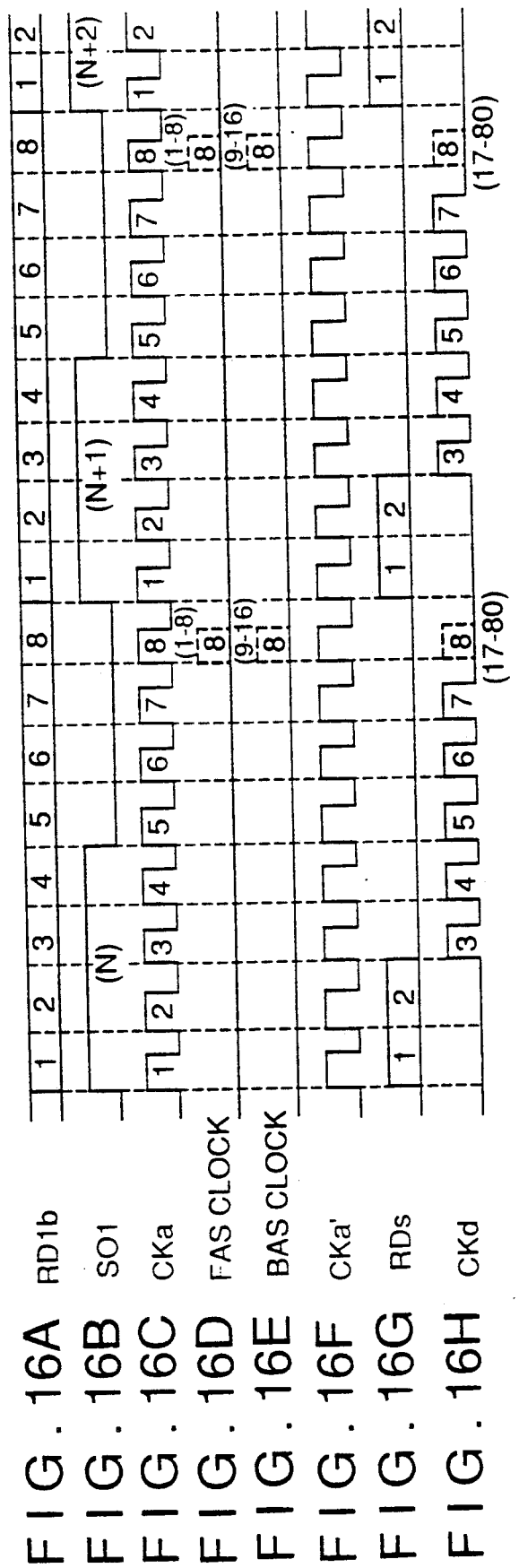

DATA MULTIPLEXING AND SEPARATION METHOD

BACKGROUND OF THE INVENTION

The present invention relates to data multiplexing and separation methods and in particular, to a data multiplexing and separation method that performs the processing described below. At the side of data multiplexing, synchronization (clock) signals are generated so as to arrange each of the data bits at the bit positions that have been set beforehand on the frame bit signals that have a required number of bits for each clock and that correspond to the data type and the transmission speed of a plural number of data that includes at least the voice data that is to be multiplexed, and the data is input from the data generation source by the synchronizing (clock) signals. Also, at the data separation side, the received data is used as the basis for the generation of synchronization signals and synchronization of each frame is detected by the synchronizing signals and after the completion of frame synchronization, the data is successively taken from the bit positions of the frame data signals that are received, corresponding to the plural number of data types and transmission speeds that have been multiplexed. Furthermore, the data that has been take is output to a data input apparatus that correspond to the data that has been taken.

The method stipulated by CCITT (International Telegraph and Telephone Consultative Committee) Recommendation H.221 for example, is a data multiplexing and separation method that uses a single information channel to transmit data having a plural number of channels. This Recommendation H.221 stipulates the bit positions to be arranged on the frame data signals that have a required number of bits for each clock, in accordance with the transmission speed and the data type of a plural number of data that are multiplexed. By this, voice data, motion picture data and other types of data can thus be multiplexed.

However, with CCITT Recommendation H.221, there is multiplexing of a plural number of data each of which have a different data type and differs transmission speeds and a plural number of multiplexing statuses are formed because of this. When an apparatus is configured so as to correspond to these respective multiplexing statuses, the configuration of the apparatus becomes complex and there is also the problem that the cost of the apparatus increases.

SUMMARY OF THE INVENTION

In the light of these problems, the present invention has as an object the provision of a data multiplexing and separation method that enables the inexpensive configuration of a data transmission and receiving apparatus in conformity with CCITT Recommendation H.221.

Another object of the present invention is the provision of a data multiplexing and separation method that enables a single piece of hardware to correspond to a plural number of multiplexing statuses for each data multiplexing when there is the multiplexing of a plural number of data having different data types and transmission speeds.

Yet another object of the present invention is to provide a data multiplexing and separation method that can multiplex and separate data by the detection of a bit position of a bit affiliated with each data arranged on a frame data signals.

Still another object of the present invention is to provide a data multiplexing and separation method that can use reference clocks of frame data signals so as to detect bit positions on said frame data signals.

Still another object of the present invention is to provide a data multiplexing and separation method that can store timing data so as to detect bit positions on the frame data signals.

Still another object of the present invention is to provide a data multiplexing and separation method that can perform each step in parallel with each step multiplexing and separating of data by using the timing data.

In order to attain these objectives, the present invention provides a data multiplexing and separation method wherein timing data from a timing data storage means that stores timing data so as to detect bit positions on a frame data signal on which bits respectively affiliated with the plural number of data are arranged, uses this timing data as the basis to judge bit positions on frame data signals and performs data separation that takes bits affiliated with each data from that bit positions, and uses this timing data as the basis for judging bit positions on frame data signals and perform data multiplexing processing that arranges bits affiliated with each data to that bit positions.

By this, processing of data multiplexing and separation is performed by taking timing data respectively corresponding to a plural number of data that have mutually different data types and transmission speeds, from the timing data storage means so that it is possible to have the processing by the single piece of hardware and therefore reduce the apparatus cost.

Other objects and features of the present invention will become apparent from the following detailed description of the present invention, with reference to the appended drawings.

BRIEF DESCRIPTION OF THE DRAWINGS

FIG. 3 is an outline view showing an example of a signal format of a frame alignment signal FAS, FIG. 4 is an outline view showing the transmission procedure for frame data, FIG. 5 is a view showing an example of a data pattern when signals of each subchannel, a frame alignment signal FAS, an application channel AC and a bit rate allocation signal BAS are taken, FIG. 8A is an outline view showing another example of a multiplexing status, FIG. 8B is an outline view showing the data pattern when multiplexing data of FIG. 8A is respectively taken, FIG. 9 is an outline view showing one example of timing data when multiplexed data is taken in accordance with the transmission speeds of a voice channel, a motion picture channel and a data channel, FIGS. 14A through 14H are operating waveform diagrams describing the operation of the apparatus of FIG. 12 when data having the multiplexing statuses shown in FIGS. 6A, 6B are taken, FIGS. 15A through 15I are operating waveform diagrams describing the operation of the apparatus of FIG. 12 when data having the multiplexing statuses shown in FIGS. 7A, 7B are taken, and FIGS. 16A through 16H are operating waveform diagrams describing the operation of the apparatus of FIG. 12 when data having the multiplexing statuses shown in FIGS. 8A, 8B are taken.

DESCRIPTION OF THE PREFERRED EMBODIMENTS

The following is a detailed description of embodiments of the present invention, with reference to the appended drawings, and starting with a description of a multiframe as defined in CCITT Recommendations H.221. Here, a single frame is set so as to have a time of 10 milliseconds, and for example in the information channels B1, B2 in the basic interface of ISDN (International Service Digital Network), the data transmission speed is 64Kbps and so one frame is comprised from 640 bits. The following description is for the case of application to this ISDN B-channel.

Figure 1:
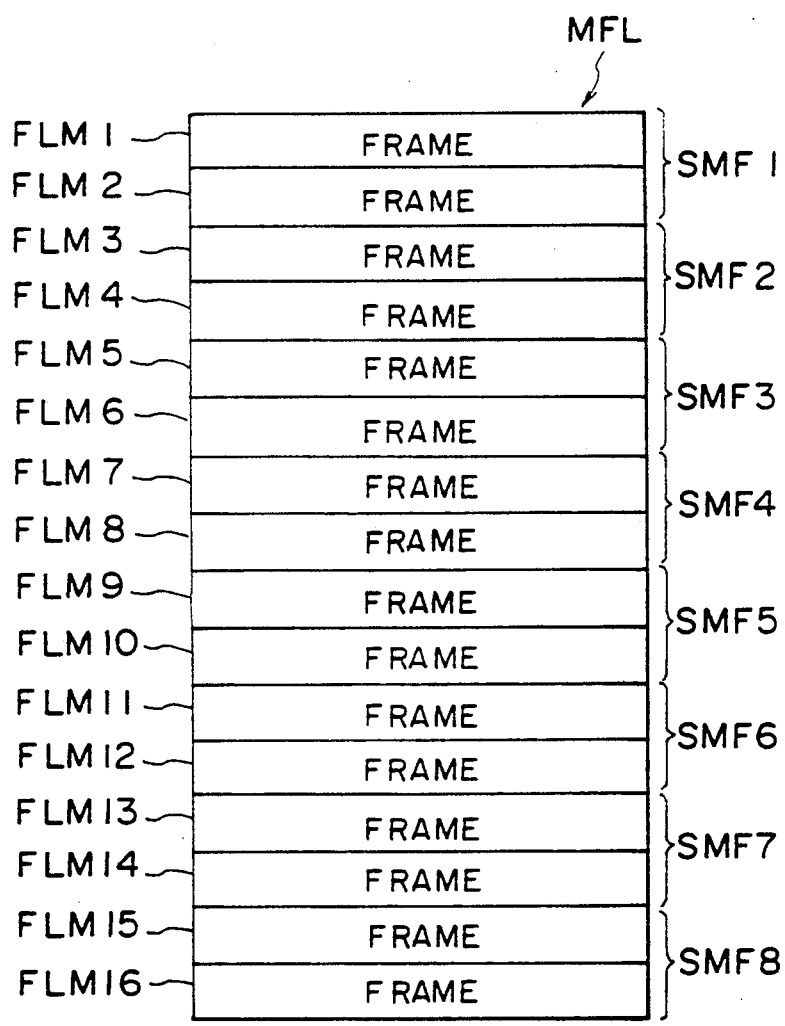
FIG. 1 is an outline view showing an example configuration of a multiframe of CCITT H.221.

As shown in FIG. 1, a single multiframe MFL consists of the eight sub-multiframes SMF-1 through SMF-8, and each of these eight sub-multiframes SMF-1 through SMF-8 is configured from two frames. More specially, a single multiframe MFL comprises the 16 frames FLM1 through FLM16.

Figure 2:
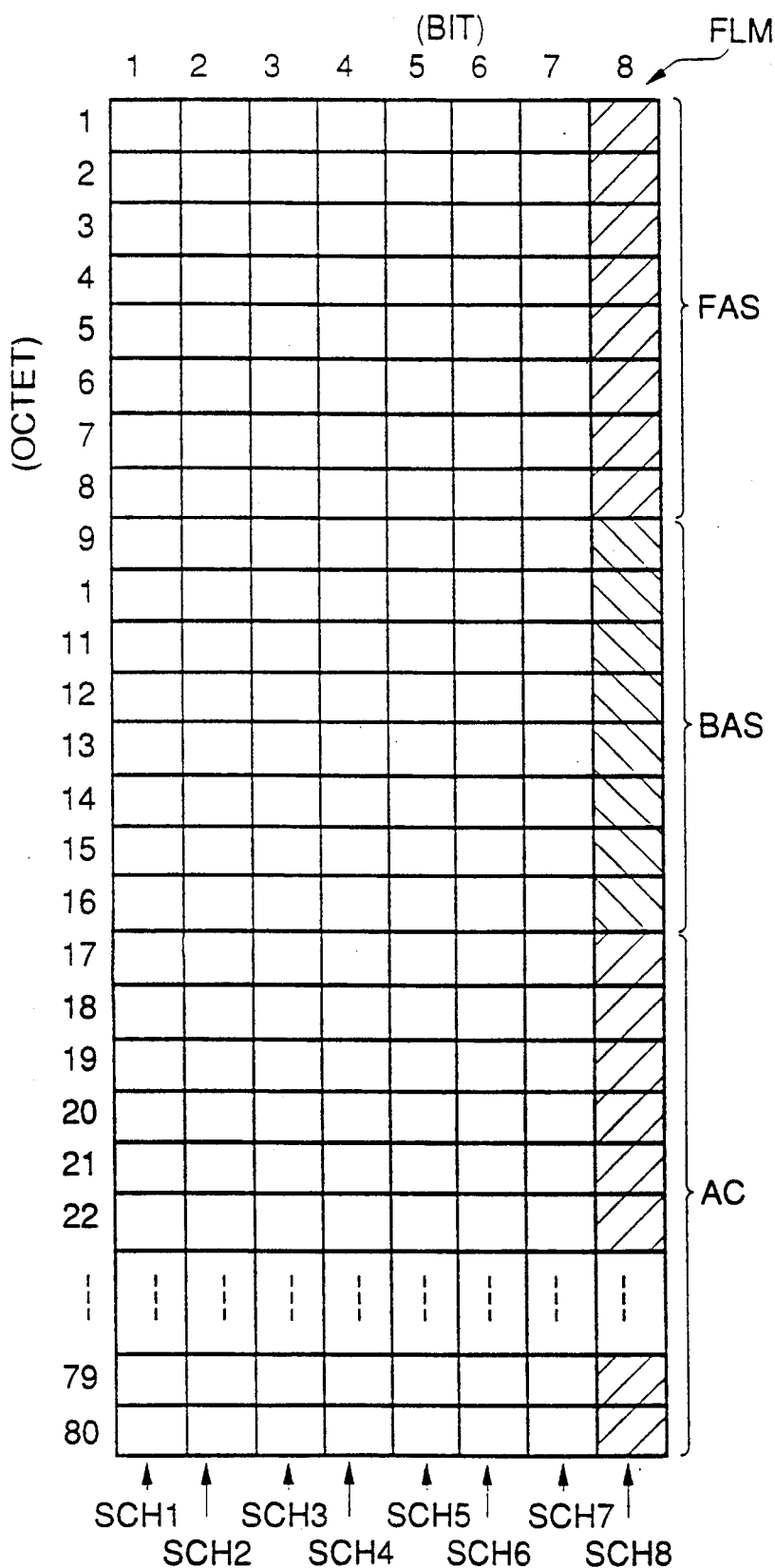
FIG. 2 is an outline view showing an example of a frame signal format.

As shown in FIG. 2, the 16 frames FLM1 through FLM16 consist of 80 octets of data, and when these octets are arranged in the bit order, the respective bit position configure the sub-channels SCH1 through SCH8.

In addition, the eighth bits of the 1st through 8th octets configure a frame alignment signal (FAS), and the 8th bits of the 9th through 16th octets configure a bit rate allocation signal (BAS). More specifically, the sub-channel SCH8 is allocated to the 8th bits of the 17th through 80th octets. In addition, the sub-channel SCH8 is called the application channel (AC). In the 17th through 24th octets of the subchannel SCH8 there are optionally set data for the coding channel for transactions for key information for coding the data.

To each of the frames FLM1 through FLM16 are arranged the frame alignment signals FAS of the 8 bits. As shown in FIG. 3, this bit allocation is configured using multiframes MFL as units.

More specifically, to the 2nd through 8th octets of the odd-numbered frames FLM1, FLM3, ... FLM11 are arranged the horizontal synchronization signals that comprise the 7-bit data pattern of "0011011". Also, to the 1st octet of the even-numbered frames FLM2, FLM4, ... FLM12 are arranged the vertical synchronization signals that comprise the 6-bit data pattern of "001011".

The detection of these horizontal synchronization signals and vertical synchronization signals enables the detection of synchronization of a single multiframe MFL.

In addition, the bits N1, N2, N3, N4, N5 of the 1st octets of the 1st frame, 3rd frame, 5th frame, 7th frame and 9th frame are used for the display of the multiframe number. Of these, bit N5 is used for the display of whether or not the multiframe number is used.

Also, the bits R1, R2, R3, R4 of the 1st octets of the 11th frame, 13th frame, 14th frame and 16th frame are used for the display of the connection number that expresses the order of connection of the information channels that carry the frames, out of those information channels that are currently being used.

In addition, the bit TEA of the 1st octet of the 15th frame is used to display that there is the status where data transmission is not possible because of some internal obstacle in the data terminal apparatus.

Also, the bit A's of the 3rd octets of the even-numbered frames FLM2, FLM4, ... , FLM16 is used to display whether a synchronization slip has occurred or whether there is the establishment of frame synchronization or multiframe synchronization.

More over, a synchronization slip in this case is for example when there is missing data for a certain cycle along the data flow, so that the next data takes the place of that portion is shortened.

In addition, the bits C1, C2, C3, C4 of the 5th octets, 6th octets, 7th octets and 8th octets of the even-numbered frame FLM2, FLM4, ... , FLM16 are for the display of the cyclic redundancy check (CRC) code that is referred to for data error detection of two continuous frames (that is, sub-multiframes). The bit E of the 4th octets of the even-numbered frames FLM2, FLM4, ... , FLM16 are used for display of a transmission error detection on the signal receiving side.

Then, the transmission of data of the multiframe MFL is performed by transmission of frames in the order of the frame numbers. As shown in FIG. 4, each of the frames FLM1 through FLM16 has the octets sent in order from the 1st octet to the 80th octet, and in each of the octet, the transmission starts from the first bit.

More specifically, in each of the frames FLM1 through FLM16, the 1st bit of the 1st octet is transmitted first, and the 8th bit of the 80th octet is transmitted last.

Accordingly, the timing at which the data of the sub-channel SCH1 of each of the frames FLM1 through FLM16 is sent as shown in FIG. 5. More specifically, this timing is in agreement with the timing of the data 1 (that expresses the data "1" status; hereinunder the same) of the data pattern 01H (where xxH expresses a hexadecimal numbering; hereinunder the same) that changes (where changes means a status of that changes; hereinunder the same) with the reference clock (64Kbps) for each of the 1st through 80th octets of the frame data. In the same manner, the data timing of the sub-channels SCH2 through SCH7 is such that it is in agreement with the timing of the data 1 of the data patterns 02H, 04H, 08H, 10H, 20H, 40H that change with the reference clock, for each of the 1st through 80th octets of the frame data.

In addition, the data timing of the frame alignment signal FAS is such that it is in agreement with the timing of the data 1 of the data pattern 80H that changes with the reference clock, for each of the 1st through 8th octets of the frame data and such that it is in agreement with the timing of data 1 of the data pattern 00H (more specifically, that which does not appear; hereinunder the same) that changes with the reference clock, for each of the 9th through 80th octets of the frame data.

Also, the data timing of the bit rate allocation signal BAS is such that it is in agreement with the timing of the data 1 of the data pattern 80H that changes with the reference clock, for each of the 1st through 8th octets and each of the 17th through 80th octets of the frame data and such that it is in agreement with the timing of data 1 of the data pattern 80H that changes with the reference clock, for each of the 9'th through 16th octets of the frame data.

In addition, the data timing of the application channel AC is such that it is agreement with the timing of the data 1 of the data pattern 00H that changes with the reference clock for the 1st through 16th octets of the frame data, and such that it is in agreement with the timing of the data 1 of the data pattern 80H that changes with the reference clock, for the 17th through 80th octets.

Here, the transmission speed is 64Kbps and the frame data is 640 bits and so 1 bit of the frame data uses a data transmission speed of 100 bps(=64000/640). The transmission speed of the data that is used by 1 sub-channel SCH is 8Kbps (=100*80).

Figures 6A, 6B:
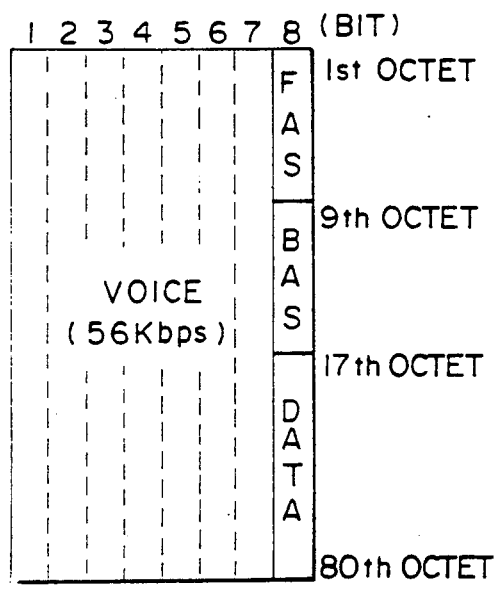
FIG. 6A is an outline view of an example of a multiplexing status.
FIG. 6B is an outline view showing the data pattern when the multiplexing data of FIG. 6A is respectively taken.

Then, if for example, when there is multiplexing of a voice channel with a data transmission speed of 56Kbps, and a data channel with a data transmission speed of 6.4Kbps, then as shown in FIG. 6A, the data of the voice channel is arranged in such channels SCH1 through SCH7. In addition, the data of the data channel is arranged in the portion of the application channel AC. This multiplexing mode is, for example, applicable to the case when telephones and telewriting terminals are used simultaneously.

Accordingly, in this case and as shown in FIG. 6B, the data timing of the voice channel is equivalent to the timing of the data of the data pattern 7FH that changes by the 64Kbps reference clock for the 1st through 80th octets. In addition, the data timing of the data channel is the same as the timing of the application channel AC described above.

Moreover, the frame adjustment signal FAS and the bit rate allocation signal BAS have fixed positions and so their data timing always becomes the timing described above.

Figures 7A, 7B:
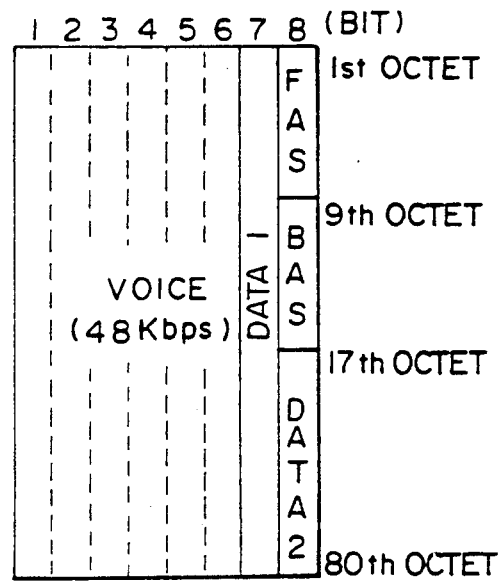
FIG. 7A is an outline view of another example of a multiplexing status.
FIG. 7B is an outline view showing the data pattern when multiplexing data of FIG. 7B is respectively taken.

In addition, when there is the multiplexing of a voice channel that has a data transmission speed of 48Kbps, a data channel 1 that has a data transmission speed of 8Kbps and a data channel 2 that has a data transmission speed of 8Kbps and a data channel 2 that has a data transmission speed of 6.4Kbps, then as shown in FIG. 7A, the data of the voice channel is arranged in sub-channels SCH1 through SCH6. In addition, data channel is arranged in sub-channel SCH7 and data channel 2 is arranged in the application channel AC. This multiplexing status is for example, applicable to the case when a telephone, a telewriting terminal and a group IV facsimile terminal are being used simultaneously.

Accordingly, in this case and as shown in FIG. 7B, the data timing of the voice channel is equivalent to the timing of data 1 of the data pattern 3FH that changes for the reference clock, for the 1st through 80th octets and the data timing of data channel 1 is equivalent to the timing of data 1 of the data pattern 40H that changes for the reference clock, for the 1st through 80th octets. Furthermore, the data timing of data channel 2 is the same as the timing of the application channel AC described above.

In addition, when there is multiplexing of a voice channel having a data transmission speed of 16Kbps and a motion picture channel having a data transmission speed of 46.4Kbps, then as shown FIG. 8A, the data of the voice channel is arranged in sub-channel SCH1, SCH2. In addition, the data of the motion picture channel is arranged in the sub-channels SCH3 through SCH7 and also in the application channel AC. This multiplexing mode is applicable to television telephone terminals, for example.

Accordingly, in this case and as shown in FIG. 8B, the data timing of the voice channel is equivalent to the timing of data 1 of the data pattern 03H that changes for the reference clock, for the 1st through 80th octets. Also, the data timing of motion picture channel is equivalent to the timing of data 1 of the data pattern 7CH that changes for the reference clock, for the 1st through 16th octets, and the timing of data 1 of data pattern FCH that changes for reference clock for 17th through 80th octets.

In this manner, various data bits are set in positions arranged inside frames and so as to correspond to the respective data types and transmission speeds of the data that is to be multiplexed.

FIG. 9 shows the timing data that expresses the timing of data for transmission speeds that are respectively applicable to a voice channel, a motion picture channel and a data channel.

In FIG. 9, for example, FFH*80 which is timing data of data transmission speed of 64Kbps for the voice channel expresses that for the single frame data, data pattern FFH is transmitted for 80 times continuously. In addition, the (7FH*16, FFH*64) which is the timing data of data transmission speed of 62.4Kbps for the motion picture channel, expresses that the data pattern 7FH is transmitted for 16 times continuously and that the data pattern FFH is transmitted for 64 times continuously.

In this embodiment of the present invention, this timing data is used to judge the data timing for when there is data multiplexing and data separation for each of those data channels that are multiplexed.

Figure 10:
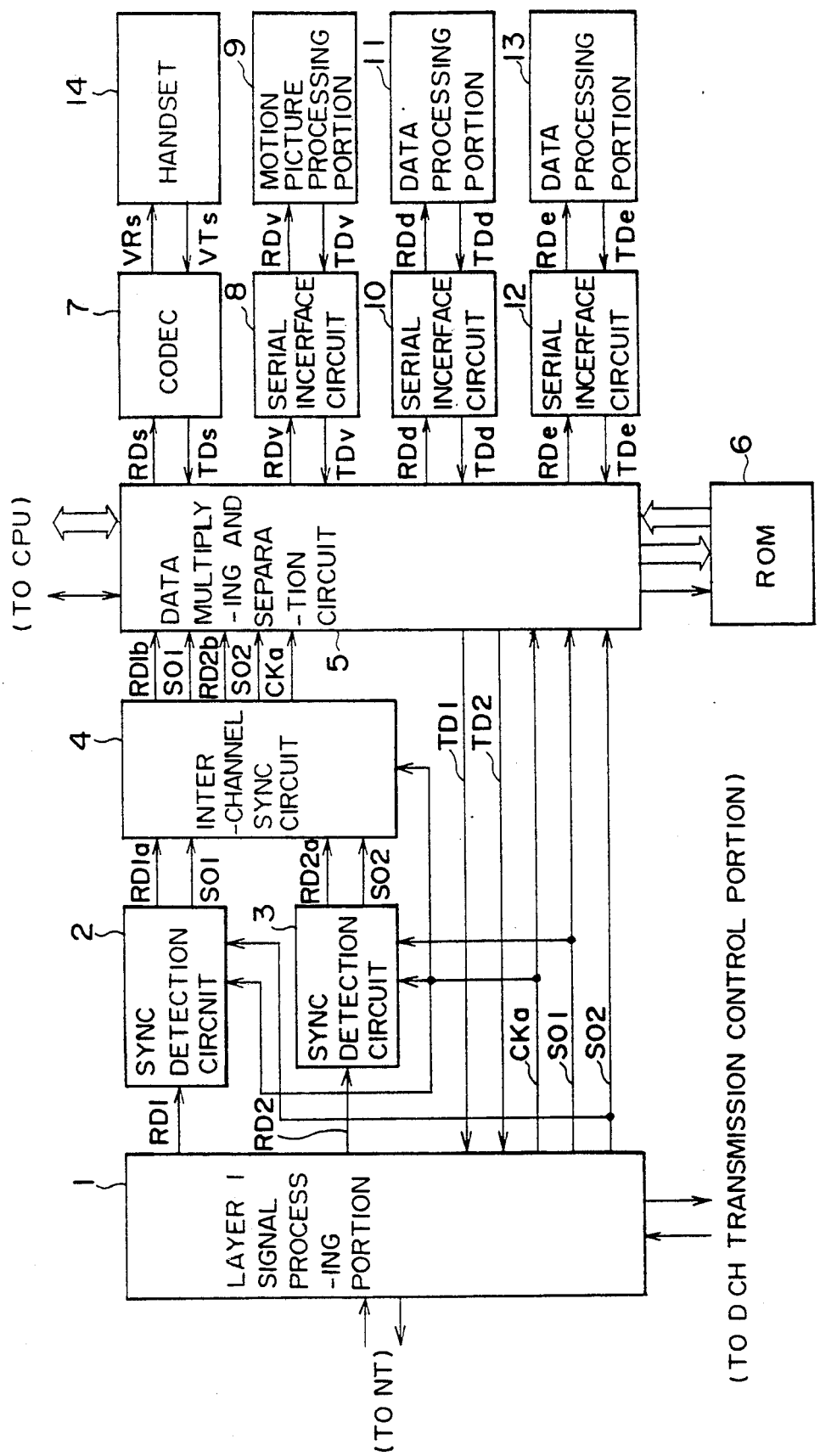
FIG. 10 is a block diagram showing an outline of an important part of a data transmission and receiving apparatus relating to one embodiment of the present invention.

FIG. 10 is a view showing an outline of important parts of a data transmission apparatus relating to an embodiment of the present invention. Moreover, in FIG. 10, a control portion such as a CPU (Central Processing Unit) an input/output device or some other device that does not relate directly to the present invention has been omitted.

In FIG. 10, the layer 1 signal processing portion 1 is connected to the basic interface of the ISDN. Also, this layer 1 signal processing portion 1 is provided with a function to separate and combine the signals of the signal channel D and the two information channels B1, B2 that are multiplexed by the basic interface. Furthermore, the layer 1 signal processing portion 1 separates and extracts the reference clock CKa of the transmitting and receiving data, the octet clocks S01, S02 that express the octet sync timing of the information channels B1, B2, and the signal receive data RD1, RD2 of the information channels B1, B2. Furthermore, the layer 1 signal processing portion 1 performs transactions with the D-channel transmission control portion for the signals of the signal channel D. Moreover, the signal processing portion in this embodiment of the present invention can be configured so as to separate and combine the signals of two information channels, but the circuit configuration can separate and combine the signals,. of three or more information channels. The circuit configurations to be described later can be configured so as to separate and combine the signals of the information channels as described above.

The reference clock CKa is applied to the sync detection circuits 2, 3, the inter-channel sync circuit 4 and the data multiplexing and separation circuit 5. The octet clock S01 is applied to the sync detection circuit 2 and the data multiplexing and separation circuit 5. The octet clock S02 is applied to the sync detection circuit 3 and the data multiplexing and separation circuit 5.

The sync detection circuits 2, 3 are in sync with the reference clock CKa and the octet clock S01, S02, and the layer 1 signal processing portion 1 detects the frame start timing of the received signal data RD1, RD2 that has been separated and extracted, and judges the frame sync. After the judging of frame sync, the sync detection circuits 2, 3 output the receive signal data RD1a, RD2a and the octet clock S01, S02 to the inter-channel sync circuit 4.

In sync with the reference clock CKa and the octet clock S01, S02, the inter-channel sync circuit 4 checks the bits N1, N2, N3, N4, N5 of the frame alignment signal FAS of the received signal frames RD1a, RD2a judges the order number of the frames of the received signal data RD1, RD2, and forms a inter-channel sync status in agreement with those order numbers. When the inter-channel sync is completed, the inter-channel sync circuit 4 outputs the received data RD1b, RD2b, the octet clock S01, S02 and the reference clock CKa to the data multiplexing and separation circuit 5.

Moreover, this inter-channel sync circuit 4 functions effectively in the case when the two information channels B1, B2 are being used at the same time, and when they are not, outputs the octet clock S01, S02 and the receive signal data RD1b, RD2b of either one of the information channels B1, B2 to the data multiplexing and separation circuit 5.

The ROM (Read Only Memory) 6 stores the timing data shown in FIG. 9. The timing data stored in the ROM are read out by the data multiplexing and separation circuit.

The data multiplexing and separation circuit 5 reads the timing data of the length specified by the head address that has been posted from the CPU, at the frame cycle from the ROM 6. Furthermore, in sync with the reference clock CKa and the octet clocks S01, S02, the data multiplexing and separation circuit 5 separates and extracts the voice channel receive data RDs, the receive signal data RDv of the motion picture channel, the receive signal data RDd of the data channel 1 and the receive signal data RDe of the data channel 2, from the receive signal data Rd1b, RD2b on the basis of the read timing. Furthermore, the receive signal data RDs is applied to a CODEC7, and the receive signal data RDv is applied to the motion picture processing portion 9 via the serial interface circuit 8. The receive signal data RDd is applied to the data processing portion 11 via the serial interface circuit 10. The receive signal data RDe is applied to the data processing portion 13 via the serial interface circuit 12.

The CODEC7 converts between the voice analog signals and the corresponding digital data for each direction. The voice receive signals VRs that correspond to the receive signal data RDs are applied to the handset 14 for speech. The voice transmission signals VTs that are input by the operator using the handset 14 are converted into transmission signal data TDs of the corresponding digital data. Those transmission signal data TDs are applied to the data multiplexing and separation circuit 5.

The motion picture processing portion 9 performs display, storage and signal processing of the received signal images corresponding to the received signal data RDv, and outputs transmission signal data TDv obtained from input from a video camera or the like, to the data multiplexing and separation circuit 5 via the serial interface 8.

The data processing portion 11, 13 performs required processing corresponding to the received signal data RDd, RDe and performs either display or output, and also forms the transmission data TDd, TDe, and outputs to the data multiplexing and separation circuit 5 via the serial interface circuit 10, 12.

The data multiplexing and separation circuit 5 read the timing data of the length specified by the head address posted from CPU in frame units from the ROM6. Furthermore, in sync with the reference clock CKa and the octet clocks S01, S02, the data multiplexing and separation circuit 5 arranges the transmission signal data TDs, TDv, TDd, TDe at the required bit position of successive frame data on the basis of the read timing data, and forms the transmission data TD1, TD2. This transmission data TD1, TD2 is output to the layer 1 signal processing portion 1.

Figure 11:
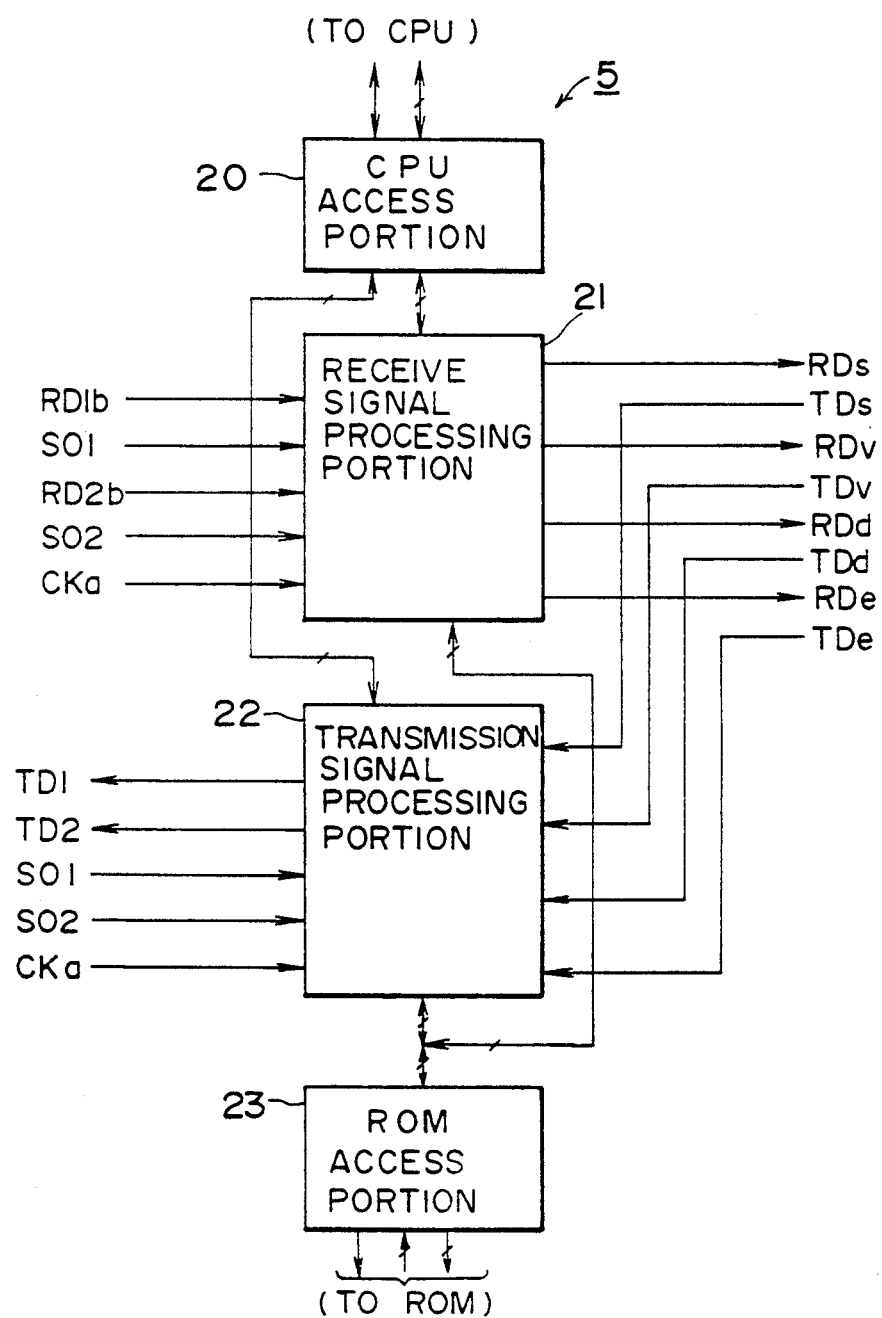
FIG. 11 is a block diagram showing one example of a data multiplexing and separation circuit.

FIG. 11 shows one example of a data multiplexing and separation circuit 5.

In FIG. 11, the CPU access portion 20 outputs the data that is input from the CPU, and respectively outputs it to the receive signal processing portion 21 and the transmission signal processing portion 22, and inputs data having respect to the CPU, from the receive signal processing portion 21 and the transmission signal processing portion 22, and transfers it to the CPU.

The following processing is performed in the receive signal processing portion 21. With respect to the voice channel, the motion picture channel, the data channel 1 and the data channel 2, the timing data of the length specified from the head address posted from the CPU is read in byte units at the frame start timing, and this read performed in sync with the octet clocks S01, S02 via the ROM access portion 23. In addition, this read timing data is used as the basis for the separation and extraction of the receive signal data RDs of the voice channel from the receive signal data RD1b, RD2b. Also, the receive signal data RDv of motion picture channel, the receive signal data RDd of data channel 1 and the receive signal data RDe of data channel 2 are separated and extracted. Furthermore, the clock for the extraction of bits having the necessary data from these receive signal data RDv, RDd and RDe is formed.

The next processing is performed at the transmission signal processing portion 22. There is the read in byte units at the frame start timing, of the timing data of a length specified from the head address posted from the CPU, for the voice channel, the motion picture channel, the data channel 1 and the data channel 2. This read is performed in sync with the octet clocks S01, S02, and via the ROM access portion 23. In addition, the timing data that is read is used as the basis for the arrangement at the required bit position of the successive frame data, of the transmission data TDs, TDv, TDd, TDe and the frame alignment signal FAS and the bit rate allocation signal BAS is appended to the frame data, and the transmission signal data TD1, TD2 are formed.

Upon request from the receive signal processing portion 21 and the transmission signal processing portion 23, the ROM access portion 23 reads single byte data of the address specified from the ROM 6, and that read single byte data is transferred to either the receive signal processing portion 21 or the transmission signal processing portion 23, which requires to receive it.

Figure 12:
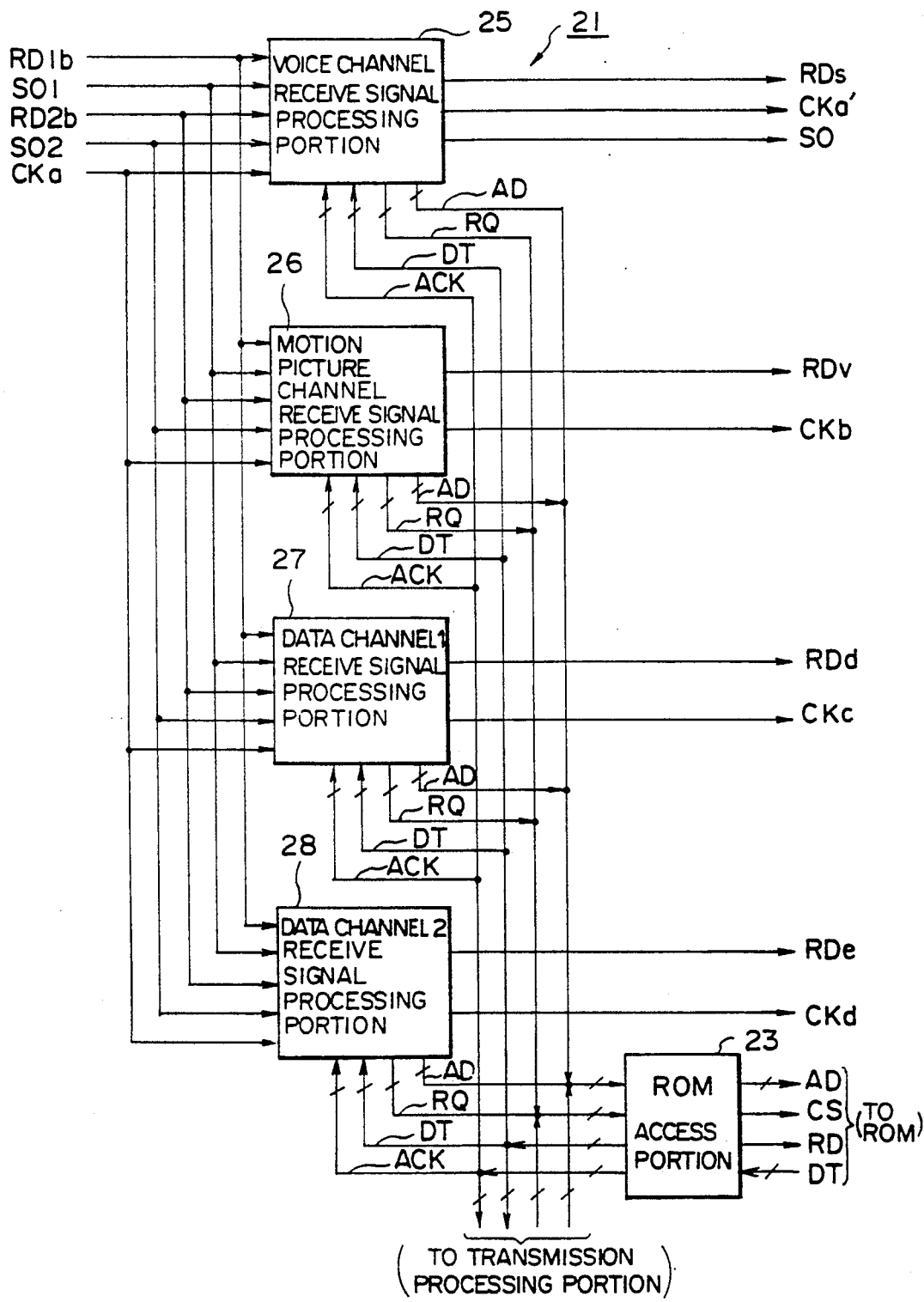
FIG. 12 is a block diagram showing one example of a signal receive processing circuit.

FIG. 12 shows one example of the receive signal processing portion 21.

In the figure, the voice channel receive signal processing portion 25 performs the following processing when the data of a multiplexed voice channel is separated. The timing data of the length specified from the head address posted by the CPU is read in byte units at the frame start timing. This read is performed in sync with the octet clocks S01, S02 via the ROM access portion 23. In addition, the receive signal data of the voice channel is extracted on the basis of the timing data that is read, from the receive signal data RD1b, RD2b and that receive signal data RDs, the clock CKa' (equivalent to the reference clock CKa), and the octet clock S0 are output to the CODEC7.

The motion picture channel receive signal processing portion 26 performs the following processing when there is the separation of motion picture channel data that has been multiplexed. The timing data of the length specified from the head address posted from the CPU is read in byte units at the frame start timing. This read is performed in sync with the octet clocks S01, S02 via the ROM access portion 23. Of the receive signal data RD1B, RD2b, the receive signal data RDv of the motion picture channel is separated and extracted. This is, for example, the extraction of one of RD1b and RD2b. Furthermore, the clock CKb in order to take the bit having the necessary data from the receive signal data RDv is formed on the basis of the read timing data described above. The receive signal data RDv and the clock CKb are output to the serial interface circuit 8.

In addition, the motion picture channel receive signal processing portion 26 performs the following processing when the transmission speed of 108Kbps or 62.4Kbps is set for the simultaneous use of the two information channels B1, B2. A clock that has a frequency twice that of the reference clock CKa is formed from the reference clock CKa internally. Furthermore, in sync with that internal clock are synthesized the receive signal data RD1b, RD2b and the receive signal data RDv that has a transmission speed that is the sum of those respective transmission speeds of the receive signal data RD1b, RD2b is formed. Furthermore, the clock CKb corresponding to that transmission speed is formed.

The data channel 1 receive signal processing portion 27 and the data channel 2 receive signal processing portion 28 perform the following processing when there is the separation of data of the data channel 1 and the data channel 2. The timing data of a length specified from the head address posted from the CPU is read in byte units at the frame start timing. This read is performed in sync with the octet clocks S01, S02 via the ROM access portion 23. The receive signal data RDd, RDe relating to the channels of the data channel 1 and the data channel 2 from the receive data RD1b, RD2b are respectively separated and extracted. A specific example of this is the same as for the case for the motion picture channel processing portion described earlier. The clocks CKc, CKd for taking the bit having the necessary data from the receive signal data RDd, RDe are formed on the basis of the timing data that is read. The receive signal data RDd, RDe and the clocks CKc, CKd are respectively output to the serial interface circuits 10, 12.

Figure 13:
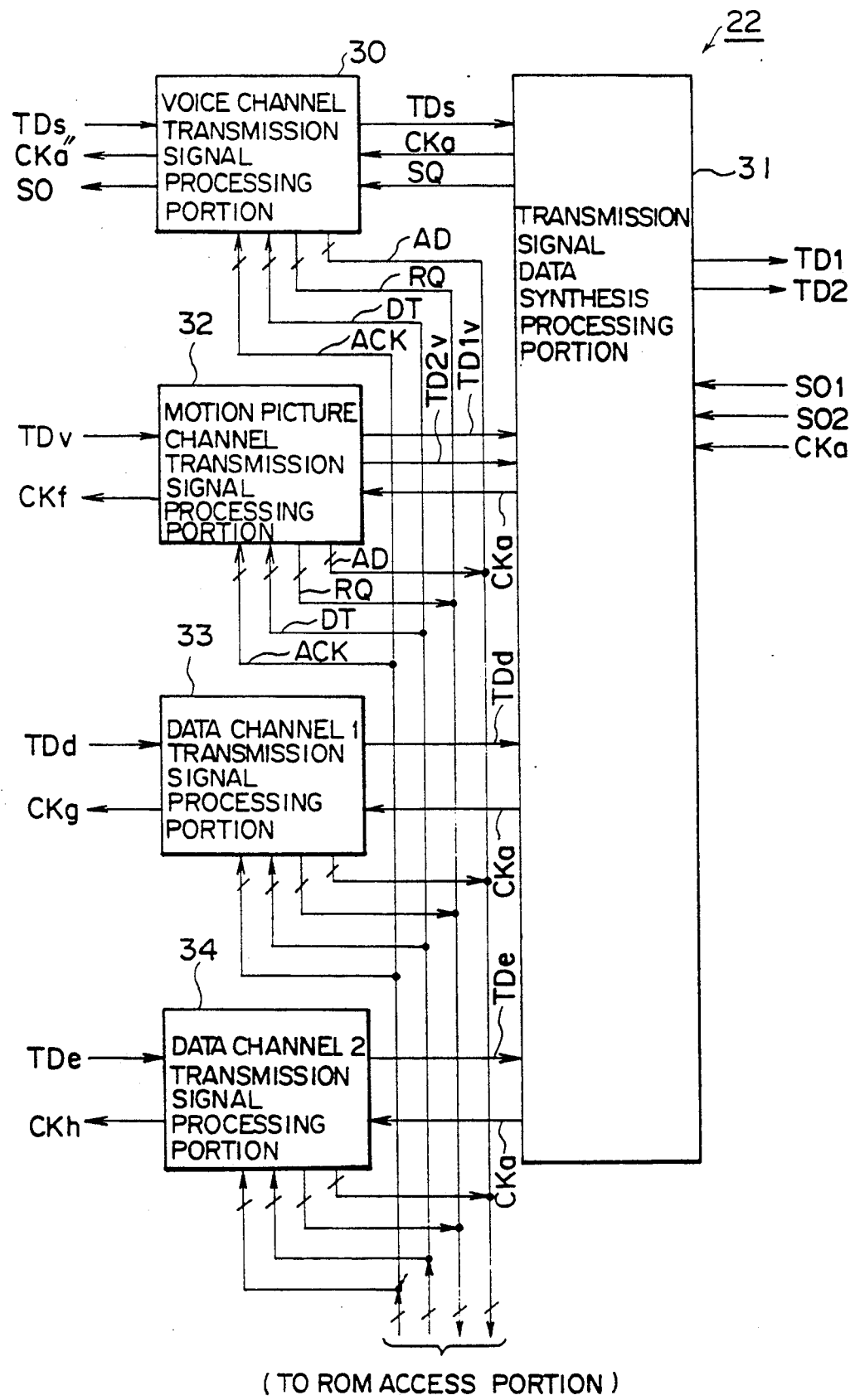
FIG. 13 is a block diagram showing one example of a signal transmit processing circuit.

FIG. 13 shows one example of a transmission signal processing portion 22.

In FIG. 13, when there is the multiplexing of data of a voice channel, the voice channel transmission signal processing portion 30 performs the following processing. The reference clock CKa that is input from the transmission signal data synthesis processing portion 31 (to be described later) is output as the transmission signal clock CKa''. The octet clock S0 input from the transmission signal data synthesis processing portion 31 is output to the data transmission side of the CODEC7. The timing data of a length specified by the head address posted from the CPU is read in byte units at the frame start timing. This read is performed in sync with the octet clock S0 via the ROM access portion 23. The transmission signal data TDs that is output from the CODEC 7 is input on the basis of the timing data that is read. This transmission signal data TDs is supplied to the transmission signal data synthesis processing portion 31.

The motion picture channel transmission signal processing portion 32 performs the following processing when there is the multiplexing of data of motion picture data. At the frame start timing, there is read in byte units of timing data of a length specified by the head address posted from the CPU. This read is performed in sync with the reference clock CKa that is input from the transmission signal data synthesis processing portion 31. The clock CKf for motion picture transmission is formed from the reference clock CKa on the basis of the timing data that is read. This clock CKf is supplied to the serial interface circuit 8. By this, the motion picture channel transmission signal processing portion 32 successively inputs the transmission signal data TDv that is held in the serial interface circuit 8. The input transmission data TDv is supplied to the transmission signal data synthesis processing portion 31 as the transmission signal data TD1v or transmission signal data TD2v.

In addition, the motion picture channel transmission signal processing portion 32 performs the following processing when the transmission speed of 108Kbps or 62.4Kbps is set for the simultaneous use of the two information channels B1, B2. A clock that has a frequency twice that of the reference clock CKa is formed internally. In addition to this, a clock CKf for motion picture transmission is formed on the basis of that internal clock and the timing data. The motion picture channel transmission signal processing portion 32 outputs the clock CKf to the circuit 8, and so is supplied with transmission signal data TDv. That supplied transmission signal data TDv is separated at the timing of insertion to the frames of the respective information channels B1, B2 and the transmission signal data TD1v, TD2v are formed. These transmission signal data TD1v, TD2v are supplied to the transmission data synthesis processing portion 31.

The data channel 1 transmission signal processing portion 33 and the data channel 2 transmission signal processing portion 34 perform the following processing when the data of the data channel 1 and the data channel 2 are multiplexed. The timing data of the length specified from the head address posted from the CPU is read in byte units at the frame start timing. This read is performed in sync with the reference clock CKa that is input from the transmission data synthesis processing portion 31. A clock CKg for transmission of the data channel 1 and a clock CKh for transmission of the data channel 2 are formed from the reference clock CKa on the basis of the timing data that is read. Those clocks CKg, CKh are respectively supplied to the serial interface circuits 10, 11. By this, the transmission signal processing portions 33, 34 are supplied with transmission signal data TDd, TDe successively that are held in the serial interface circuits 10, 11. Those supplies transmission signal data TDd, TDe are supplied to the transmission signal data synthesis and processing portions 31 respectively.

The transmission data synthesis processing portion 31 outputs the reference clock CKa to the voice channel transmission signal processing portion 30, the motion picture channel transmission signal processing portion 32, the data channel 1 transmission signal processing portion 33 and the data channel 2 transmission signal processing portion 34, and outputs the octet clock S0 to the voice channel transmission signal processing portion 30. In addition, the transmission data synthesis processing portion 31 forms the frame data on the basis of the the transmission signal data TDs, TD1v, TD2v, TDd, TDe that are respectively input from the voice channel transmission signal processing portion 30, the motion picture channel transmission signal processing portion 32, the data channel 1 transmission signal processing portion 33 and the data channel 2 transmission signal processing portion 34, the bit rate allocation signal BAS posted from the CPU, and the frame alignment signal FAS generated on the basis of each of the data that are input. This frame data is supplied to the layer 1 signal processing portion 1 as the transmission data TD1, TD2.

The following is a description of the operation when the voice channel receive signal processing portion 25, the motion picture channel receive signal processing portion 26, the data channel 1 receive signal processing portion 27, the data channel 2 receive signal processing portion 28, the voice channel transmission signal processing portion 30, the motion picture signal processing portion 32, the data channel 1 transmission signal processing portion 33 and the data channel 2 transmission signal processing portion 34 use the ROM access portion 23 to access the data of the ROM 6.

The voice channel receive signal processing portion 25, the motion picture channel receive signal processing portion 26, the data channel 1 receive signal processing portion 27, the data channel 2 receive signal processing portion 28, the voice channel transmission signal processing portion 30, the motion picture signal processing portion 32, the data channel 1 transmission signal processing portion 33 and the data channel 2 transmission signal processing portion 34, in case of having the input request status for the timing data, then supply the access request signal RQ that expresses the generation of those respective input request statuses to the ROM access portion 23.

This access request signal RQ is combined with information that identifies elements that output it. Therefore, the ROM access portion 23 can identify from which element the access request has been output.

When this access request signal RQ is supplied, the ROM access portion 23 judges whether or not it is in a status where a response for the request from the origin can be made. If it is in a status where a response can be made, then an acknowledge signal ACK that includes the identification information that expresses that origin of the request is supplied to all of the voice channel receive signal processing portion 25, the motion picture channel receive signal processing portion 26, the data channel 1 receive signal processing portion 27, the data channel 2 receive signal processing portion 28, the voice channel transmission signal processing portion 30, the motion picture signal processing portion 32, the data channel 1 transmission signal processing portion 33 and the data channel 2 transmission signal processing portion 34. When the acknowledge signal ACK is supplied the voice channel receive signal processing portion 25, the motion picture channel receive signal processing portion 26, the data channel 1 receive signal processing portion 27, the data channel 2 receive signal processing portion 28, the voice channel transmission signal processing portion 30, the motion picture signal processing portion 32, the data channel 1 transmission signal processing portion 33 and the data channel 2 transmission signal processing portion 34 check whether the contents of the acknowledge signal ACK are in agreement with the identification information that is set with respect to them. If there is agreement, then it is judged that the access request has been received, and the address signal AD of the read timing data is supplied to the ROM access portion 23.

By this, in the status where the supplied address signal is output to the ROM 6, the ROM access portion 23 supplies the chip select signal CS and the read signal RD to the ROM 6 at the appropriate timing, and the timing data DT is supplied from the ROM 6. The ROM access portion 23 sends the timing data DT to the access request side.

By this, each of the portions that have been received the access request are supplied with the timing data DT and hold it in the internal buffers of each portion.

In addition, when access request signals RQ from a plural number of portions are generated simultaneously, the ROM access portion 23 judges the portion of them that is received the request in accordance with the priority order that has been set beforehand for the voice channel receive signal processing portion 25, the motion picture channel receive signal processing portion 26, the data channel 1 receive signal processing portion 27, the data channel 2 receive signal processing portion 28, the voice channel transmission signal processing portion 30, the motion picture signal processing portion 32, the data channel 1 transmission signal processing portion 33 and the data channel 2 transmission signal processing portion 34. The ROM access portion 32 outputs acknowledge signals ACK successively on the basis of these judgement results.

In this manner, the voice channel receive signal processing portion 25, the motion picture channel receive signal processing portion 26, the data channel 1 receive signal processing portion 27, the data channel 2 receive signal processing portion 28, the voice channel transmission signal processing portion 30, the motion picture signal processing portion 32, the data channel 1 transmission signal processing portion 33 and the data channel 2 transmission signal processing portion 34 access the ROM at their respective timing data request timing and are supplied with the necessary timing data.

As shown in FIGS. 14A through 14H, when frame data of the multiplexed statuses shown in FIGS. 6A and 6B is received via the information channel B1 in the configuration described above, the receive signal data RD1b, the octet clock S01 and the reference clock CKa are applied to the receive signal processing portion 21.

At this time, the clock (FAS clock) to extract the 8-bit frame alignment signal FAS of the 1st through 8th octets of the frame data is formed internal to the receive signal processing portion 21. In addition, the clock (BAS clock) to extract the 8-bit rate allocation signal BAS of the 9th through 16th octets of the frame data is also formed. The data of the frame alignment signal FAS and the bit rate allocation signal BAS are extracted from the receive signal data RD1b by these clocks, and are transferred to the CPU via the CPU access portion 20.

In addition, in this case and as has been described above, the bit pattern 7FH is used as the timing data for the extraction of the voice channel, for the 1st through 80th octets. Accordingly, the receive signal data RDs of the voice channel becomes data where the 8th bits (MSB) of the receive signal data RD1b are masked and is successively output to the CODEC 7 in sync with the clock CKa.

In addition, as has been described above, as the timing data for the extraction of the data channel, the data pattern 00H for the 1st through 16th octets, and 80H for the 17th through 80th octets are used and so the clock CKc that is output to the serial interface circuit 10 becomes a clock where reference clock CKa masked for other than the 8th bits of the 17th through 80th octets.

By this, the receive data RDs of the voice channel that is extracted from the frame data that has the data channel 1 with a transmission speed of 16Kbps and the voice channel with a transmission speed of 56Kbps multiplexed is output to the CODEC 7. Furthermore, the clock CKc for extraction of the data channel 1 is formed and is output to serial interface circuit 10. By this, the bit having the necessary data is extracted from the receive signal data RDd of the data channel 1 and is supplied to the data processing portion 11.

In the same manner, when there are the multiplexing statuses shown in FIGS. 7A and 7B, then as shown in FIGS. 15A through 15I, the receive signal data RDs of the voice channel is formed and is output to the CODEC 7. In addition, the clock CKc of the data channel 1 and the clock CKd of the data channel 2 are formed and are respectively output to the serial interface circuits 10, 12.

By this, the respective channels are separated and extracted from the frame data that has the voice channel having a transmission speed of 48Kbps, the data channel 1 having a transmission speed of 8Kbps and the data channel 2 having a transmission speed of 6.4Kbps multiplexed.

In addition, in the same manner, in the multiplexing status shown in FIGS. 8A and 8B, then as shown in FIGS. 16A through 16H, the receive signal data RDs of the voice channel is formed and is output to the CODEC 7. In addition, the clock CKd of the motion picture channel is formed and is output to the serial interface circuit 8.

By this, the respective channels are separated and extracted from the frame data that has the voice channel that has a transmission speed of 16Kbps, the motion picture channel that has a transmission speed of 46.4Kbps multiplexed together.

Moreover, when transmission data is multiplexed, the insertion timing of the respective channel data to the frame data is the same as then there is the separation and extraction of the data and so a duplicate description is omitted here.

In this manner, with the present embodiment, it is possible to use one type of configuration to process frame data that has many types of multiplexing statuses, and therefore inexpensively realize a data transmission and receiving apparatus in conformity with CCITT Recommendation H.221.

The above description of the embodiment was for the case of connection to the basis interface of ISDN but it is also possible for the present invention to be applied in the case of use with a data transmission paths of wider bands for a primary group interface of ISDN. In these case, a ROM that stores timing data to process the respective channel data can be used in accordance with multiplexing status.

What is claimed is:

1. A data multiplexing method including:
   a timing data taking step that takes a plural number of timing data from a timing data storage means that stores said plural number of timing data, said plural number of timing data being thus used to determine bit positions of the bits for a plurality of transmission signal data respectively, said bit positions being positions in frame data signals at which the bits for said plurality of transmission signal data are arranged, said frame data signals being cyclic signals and having a predetermined number of bits for each cycle thereof, and
   a data arrangement step that uses said timing data as the basis for arranging said plural number of transmission data on said frame data signals by successively arranging the bits for said plural number of transmission data on said frame data signals;
   wherein, with regard to transmission signal data, other than voice data, of said plural number of transmission signal data, said data arrangement step is a step that uses said plural number of timing data as the basis for producing data clock pulses from reference clock pulses by masking appropriate reference clock pulses of said reference clock pulses, said reference clock pulses occurring in sync with said frame data signals, and said data arrangement step then successively arranging the bits for said plural number of transmission signal data on said frame data signals at the bit positions of the bits for said plural number of transmission signal data, said bit positions corresponding to said data clock pulses; and
   with regard to said voice data of said plural number of transmission data, said data arrangement step uses the timing data, for said voice data, of said plural number of timing data so as to appropriately mask first bit positions in the frame data signals, bits for said voice data being thus arranged on second bit positions on the frame data signals other than said first bit positions.

2. The data multiplexing method according to claim 1, wherein said plural number of timing data are set in accordance with respective data types and transmission speeds of said plural number of transmission signal data.

3. The data multiplexing method according to claim 1, wherein said timing data corresponding to said volume data is set in accordance with a transmission speed of said voice data.

4. The data multiplexing method according to claim 1, wherein said timing data taking step is a step that takes said plural number of timing data from said timing data storage means every frame of said frame data signals.

5. A data separation method including:
a timing data taking step that takes a plural number of timing data from a timing data storage means that stores said plural number of timing data, said plural number of timing data being thus used to determine bit positions of the bits for a plurality of received signal data respectively, said bit positions being positions in frame data signals at which the bits for said plurality of received signal data are arranged, said frame data signals being cyclic signals and having a predetermined number of bits for each cycle thereof, and
a data extracting step that uses said timing data as the basis for extracting said plural number of received data from said frame data signals by successively extracting the bits for said plural number of received data from said frame data signals;
wherein, with regard to receive signal data, other than voice data, of said plural number of received signal data, said data extracting step uses said plural number of timing data as the basis for producing data clock pulses from reference clock pulses by masking appropriate reference clock pulses of said reference clock pulses, said reference clock pulses occurring in sync with said frame data signals, and said data extracting step then successively extracting the bits for said plural number of received signal data on said frame data signals from the bit positions of the bits for said plural number of received signal data, said bit positions corresponding to said data clock pulses; and
with regard to said voice data of said plural number of received signal data, said data extracting step uses the timing data, for said voice data, of said plural number of timing data so as to appropriately mask first bit positions in the frame data signal, bits for said voice data being thus extracted from second bit positions on the frame data signals other than said first bit positions.

6. The data separation method according to claim 5, wherein said plural number of timing data are set in accordance with respective data types and transmission speeds of said plural number of received signal data.

7. The data separation method according to claim 5, wherein said timing data corresponding to said voice data is set in accordance with a transmission speed of said voice data.

8. The data separation method according to claim 5, wherein said timing data taking step is a step that takes said plural number of timing data from said timing data storage means every frame of said frame data signals.

9. A data multiplexing and separation method, characterized in:
taking a plural number of timing data from a timing data storage means that stores said plural number of timing data, said plural number of timing data being thus used for determining bit positions of bits for a plural number of transmission data, said bit positions being positions in frame data signals at which the bits for said plurality of transmission signal data are arranged, said frame data signals being cyclic signals and having a predetermined number of bits for each cycle;
using said plural number of timing data as the basis for producing data clock pulses from reference clock pulses by masking appropriate reference clock pulses of said reference clock pulses, said reference clock pulses occurring in sync with said frame data signals, then successively arranging the bits for said plural number of transmission signal data on said frame data signals on the bit positions of the bits for said plural number of transmission signal data, said bit positions corresponding to said data clock pulses;
taking said plural number of timing data from said timing data storage means; and
extracting a plural number of received signal data from the frame data signals by successively extracting bits for a plural number of received signal data, on the basis of said plural number of timing data.

10. A data multiplexing and separation method including:
a receive signal processing step that is supplied with a plural number of channels of frame data signals, which have been multiplexed with a plural number of data having a required number of bits for each cycle of said frame data signals, said frame data signals being cyclic signals, said frame data signal including a frame alignment signal for synchronization between said plural number of channels, and said receive signal processing step then separating said frame data signals into said plural number of channels, and respectively separating and thus extracting a plural number of reference clock pulses and a plural number of octet clock pulses, said plural number of reference clock pulses corresponding to the bits of said frame data signals respectively, and said plural number of octet clock pulses corresponding to octets of bits of said frame data signals;
a sync detect step that detects sync of said frame data signals by being in sync with said plurality of octet clock pulses, and said sync detect step verifying establishing of the sync of said frame data signals between said plural number of channels;
an inter-channel sync step that inputs said plural number of octet pulses, said plural number of reference clock pulses and said plural number of frame data signals, said inter-channel sync step thus reading frame alignment signals in sync with said plural number of references clock pulses and said plural number of octet clock pulses, said inter-channel sync step thus determining the order of respective frames of said plural number of frame data signals, said inter-channel sync step thus forming a channel sync status where the orders of the corresponding frames in the frame data signals between said plural number of channels agree with each other;
a data separating step that takes for every frame, and in accordance with an address in a timing data storage means specified by a CPU, a plural number of timing data from said timing data storage means that stores said plural number of timing data said plural number of timing data being thus used for determining bit positions of bits for a plurality of received signal data, said data separating step then separating and thus extracting sid plural number of received signal data an the basic of saidplural number of timing data:
a data multiplexing step that takes for every frame, said plural number of timing data from said timing data storage means in accordance with said address in said timing data storage means specified by said CPU, said data multiplexing step then multiplexing a plural number of transmission signal data on the basis of said plural number of timing data, on the plural number of channels of the frame data signals; and a transmission signal processing step that combines said multiplexed plural number of channels of said frame data signals.

11. The data multiplexing and separation method according to claim 10, wherein:

said plural number of received signal data includes at least voice data, and for received signal data other than said voice data, said data separation step takes the timing data corresponding to a transmission speed and a data type of said received data other than the voice data from said timing data storage means, then appropriate clock pulses of said plural number of reference clock pulses are masked on the basis of said timing data, then said received signal data other than said voice data is extracted from said frame data signals in accordance with the reference clock pulses which have not been masked; and for said voice data, said data separating step takes timing data corresponding to a transmission speed of said voice data from said timing data storage means, said data separating step then determining bit positions at which a bit affiliated with said voice data is arranged on said frame data signals on the basis of said timing data, said data separating step then extracting said voice data from said frame data signals in accordance with said timing data; and for transmission signal data other than said voice data, said data multiplexing step takes timing data corresponding to data type and a data transmission speed of said transmission signal data other than said voice data from said timing data storage means, said data multiplexing step then masking an appropriate reference clock pulse of said plural number of reference clock pulses on the basis of said timing data, said data multiplexing step then multiplexing said transmission signal data other than said voice data on the frame data signals by arranging bits affiliated with said transmission signal data other than said voice data; and for said voice data, said data multiplexing step takes timing data corresponding to a transmission speed of said voice data from said timing data storage means, said data multiplexing step then using said timing data as the basis for determining bit positions at which bits affiliated with said voice data are arranged on said frame data signals, said data multiplexing step than multiplexing said voice data on said frame data signals by arranging bits affiliated with said voice data in accordance with the judged bit positions.

12. The data multiplexing and separation method according to claim 10, wherein said data separating step and said data multiplexing step with respect respectively to said plural number of transmission data and said plural number of received data are performed in parallel and, said data separation steps and said data multiplexing steps with respect respectively to said plural number of data generate a plural number of input request signals respectively in order to read said plural number of timing data, corresponding respectively to said plural number of transmission signal data and said plural number of received signal data, from said timing data storage means;

said data separating steps and said data multiplexing steps thus successively generate a plural number of acknowledge signals to read said plural number of timing data corresponding to said plural number of transmission signal data and said plural number of received signal data respectively from said timing data storage means in accordance with a predetermined order with respect to said plural number of input request signals;

said data separating step and said data multiplexing step thus successively respectively generate a plural number of address signals to read said plural number of timing data from said timing data storage means in accordance with the respective generation of said plural number of acknowledge signals; and said timing data storage means that receives said plural number of address signals successively transmits said plural number of timing data with respect to said data separation step and said data multiplexing step respectively for said plural number of transmission signal data and said plural number of received signal data.

* * * * *